Sept. 5, 1950  A. G. MARION  2,521,385
CORE CUTTING MACHINE
Filed June 28, 1946  3 Sheets-Sheet 1
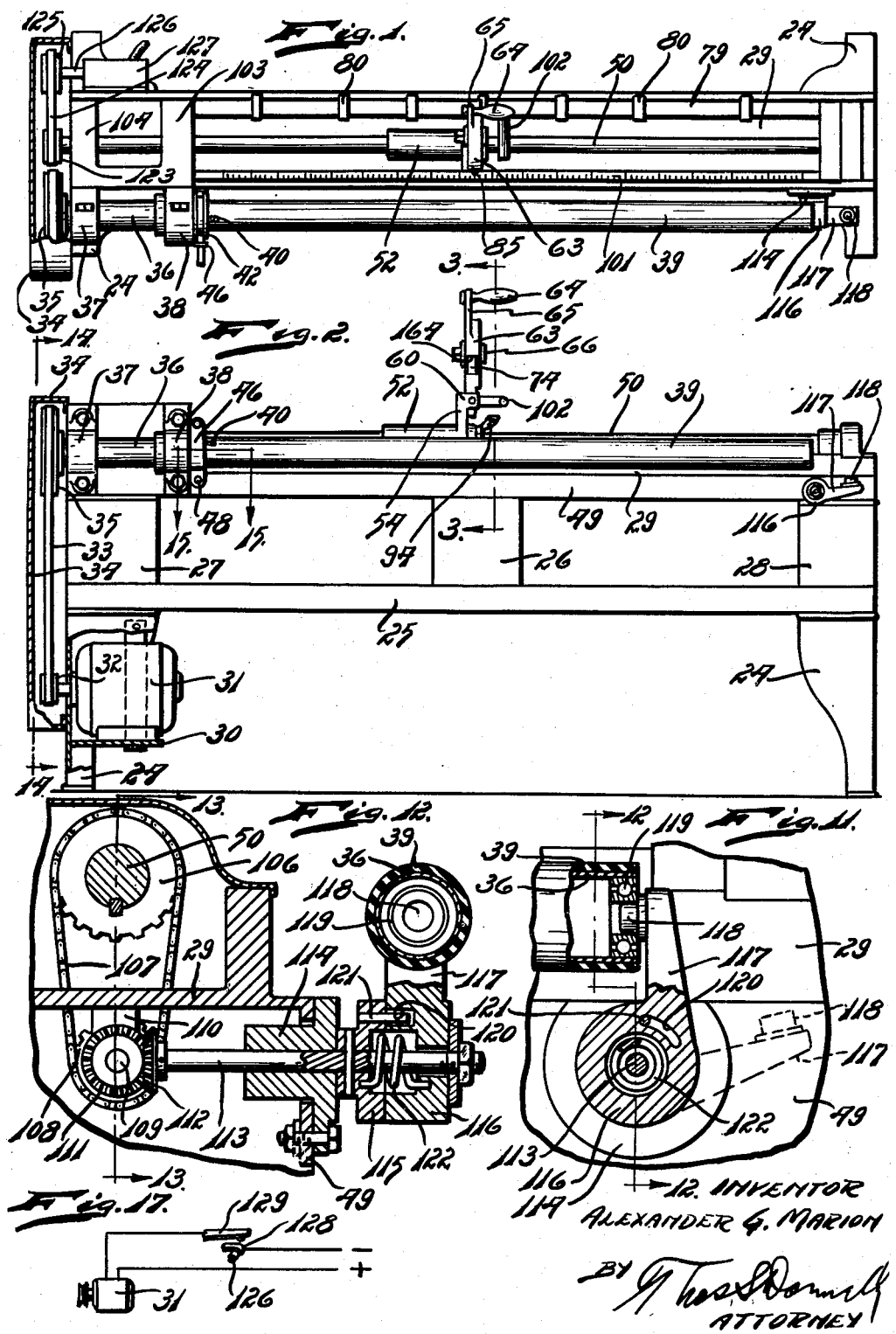

Sept. 5, 1950 　　　A. G. MARION 　　　2,521,385
CORE CUTTING MACHINE
Filed June 28, 1946 　　　　　　　3 Sheets-Sheet 2
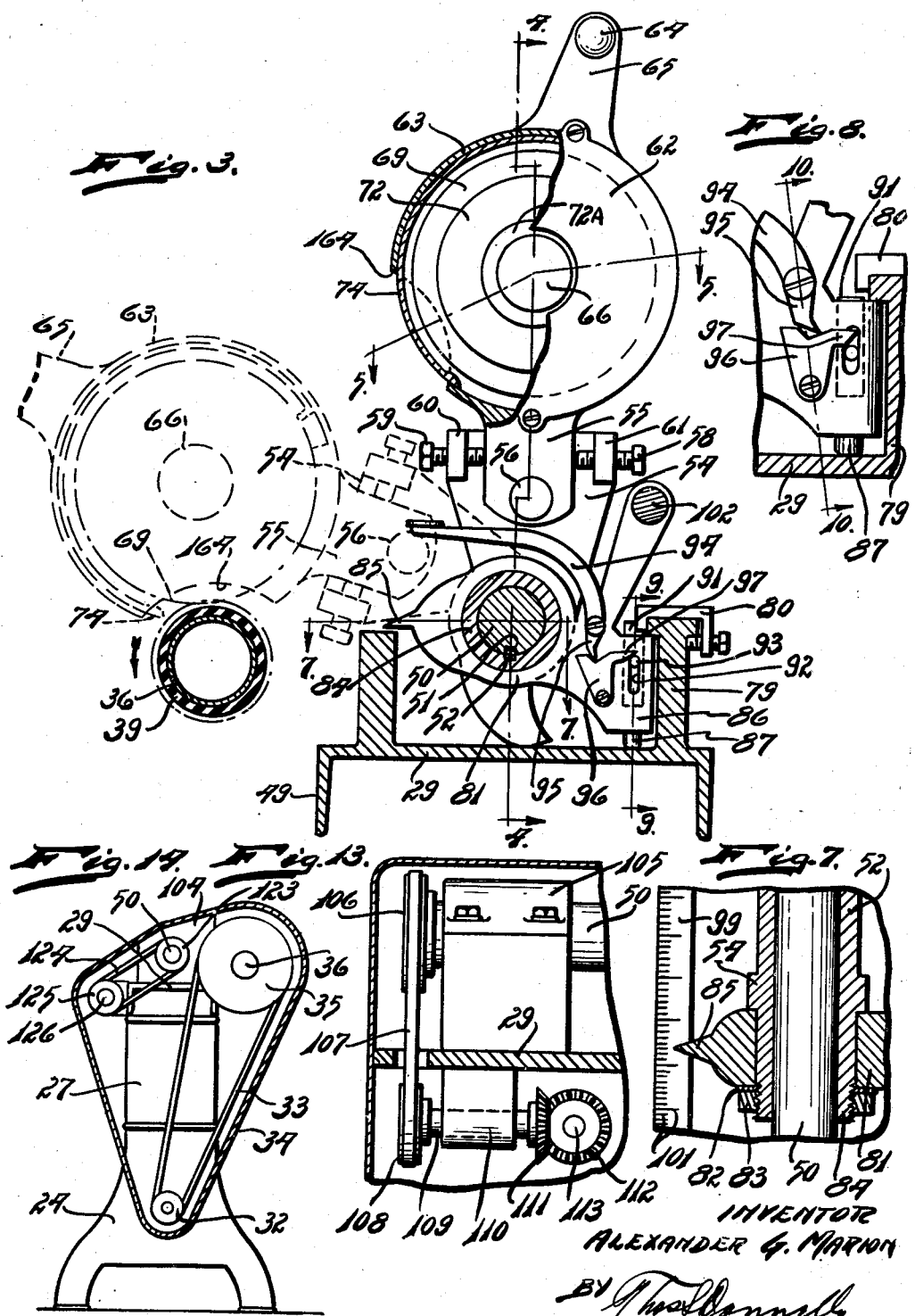
INVENTOR
ALEXANDER G. MARION
BY Thos. Donnelly
ATTORNEY Sept. 5, 1950          A. G. MARION          2,521,385
CORE CUTTING MACHINE
Filed June 28, 1946                       3 Sheets-Sheet 3
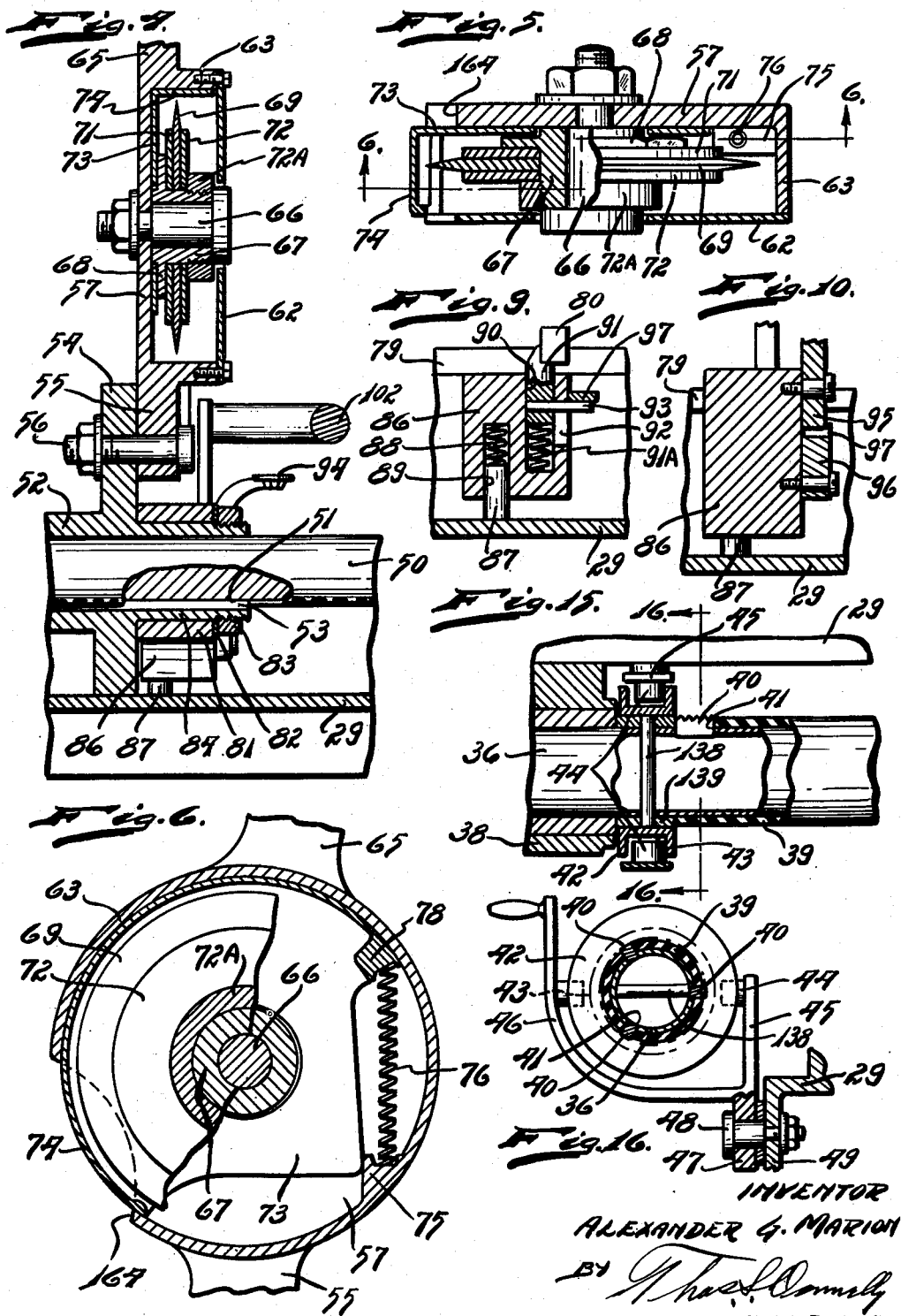
INVENTOR
ALEXANDER G. MARION
BY
ATTORNEY Patented Sept. 5, 1950

2,521,385

UNITED STATES PATENT OFFICE 2,521,385

CORE-CUTTING MACHINE

Alexander G. Marion, River Rouge, Mich., assignor to Keystone Engineering Company, River Rouge, Mich., a corporation of Michigan Application June 28, 1946, Serial No. 680,299

15 Claims. (Cl. 164—69)

My invention relates to a new and useful improvement in a core cutting machine adapted for use in cutting tubular bodies into predetermined lengths. The invention is particularly adapted for cutting paper or cardboard tubes into desired lengths.

Machines are now used for cutting such tubular bodies into desired lengths and one disadvantage of these machines is that when cutting paper or cardboard tubes, a ragged edge is obtained. It is an object of the present invention to provide a machine so constructed and arranged that this ragged edge will be eliminated and be clean cut at the ends effected.

Another object of the invention is the provision of a machine so constructed and arranged as to be most efficient in action and speedy in operation.

Another object of the invention is the provision in a machine of this class of a mechanism whereby the cutting element may be moved into cutting and non-cutting position and when the cutting element is moved to cutting position, the mandrel on which the tube to be cut is positioned will be rotated and automatically stopped when the cutting element is moved to non-cutting position.

Another object of the invention is the provision of a mandrel support swingable into supporting position and non-supporting position and swingable into supporting position upon movement of the cutting element to cutting position.

Another object of the invention is the provision in a machine of this class of adjustable stops which may be set at various positions so as to quickly determine the length of the tube to be cut.

Another object of the invention is the provision of means for gripping the tube on the mandrel so that it is positively driven during the cutting operation.

Another object of the invention is the provision in a machine of this class of a cutting element and a guard mechanism therefor and means for moving said guard mechanism to guarding and non-guarding position.

Another object of the invention is the provision in a machine of this class of a carriage which is slidable longitudinally thereof and serves to carry the cutting element.

Another object of the invention is the provision of a supporting mandrel so arranged and constructed that when the cutting element severs the tube operated upon the cutting element will not be dulled or damaged and no permanent scoring or marking will be effected on the supporting mandrel.

Other objects will appear hereinafter.

It is recognized that various modifications and changes may be made in the detail of structure illustrated without departing from the invention itself and it is intended that such shall be embraced within the scope of the claims which form a part hereof.

Forming a part of this application are drawings in which,

Fig. 1 is a top plan view of the invention,

Fig. 2 is a front elevational view of the invention,

Fig. 3 is a sectional view taken on line 3—3 of Fig. 2, with parts broken away and parts shown in side elevation, Fig. 4 is a fragmentary sectional view taken on line 4—4 of Fig. 3, Fig. 5 is a sectional view taken on line 5—5 of Fig. 3, Fig. 6 is a view taken on line 6—6 of Fig. 5, shown in fragment, Fig. 7 is a fragmentary view taken on line 7—7 of Fig. 3, Fig. 8 is an enlarged fragmentary side elevational view of the plunger actuating mechanism, Fig. 9 is a fragmentary sectional view taken on line 9—9 of Fig. 3, Fig. 10 is a fragmentary sectional view taken on line 10—10 of Fig. 8, Fig. 11 is an enlarged fragmentary side elevational view of the mandrel centering mechanism with parts broken away and parts shown in section, Fig. 12 is a fragmentary sectional view taken on line 12—12 of Fig. 11, Fig. 13 is a fragmentary view taken on line 13—13 of Fig. 12, Fig. 14 is a view taken on line 14—14 of Fig. 2, Fig. 15 is a fragmentary sectional view taken on line 15—15 of Fig. 2, Fig. 16 is a sectional view taken on line 16—16 of Fig. 15, Fig. 17 is a diagrammatic view of the wiring used in the invention.

As shown in the drawings, the invention comprises a pair of spaced apart supporting members 24 on which is mounted the supporting structure embodying the bottom 25 and the upwardly projecting supports 26, 27 and 28 on which is positioned a bed 29. Projecting outwardly from the support 24 is a bracket 30 on which is supported an electric motor 31 adapted for rotating the pulley 32 which is connected by the belt 33 to drive the pulley 35 fixedly mounted on the shaft 36. The shaft 36 is journaled at one end in the bearings 37 and 38 and on its working portion is provided with a covering 39 of rubber or other suitable material. Formed through this covering 39 and through the tubular shaft 36 are circumferentially spaced apart slots 41 in each of which is positioned a gripping member 40 having a roughened periphery. The construction is such that when a tube is placed upon the mandrel so as to overlie the gripping member 40, independent rotation of the mandrel relatively to the tube will be prevented and the tube will be forced to rotate in unison with the mandrel. Embracing the tubular shaft 36 is a ring 139 of suitable bearing material such as bronze or the like and which is keyed in position on the shaft or tube 36 by the means of the pin 138. Embracing this ring 139 is a presser ring 42 which is slidable longitudinally of the shaft 36. This member 42 is provided with a peripheral groove 43 into which projects the trunnions 44 which project outwardly from the arms 45 and 46 of the yoke, the tree 47 of which is secured by the bolt 48 to the flange 49 which projects downwardly along the edge of the bed 29. The construction is such when it is desired to remove the tube from the mandrel a rocking of the yoke will effect a slidable movement of the presser ring 42 and force the tube off the gripping members 40. Extending upwardly from bed 29 are bearings 103 and 104 journaled in which is a shaft 50. The carriage 52 is slidably mounted on the shaft 50 and as shown in Fig. 4, this shaft 50 is provided with a longitudinally extending key-way 51 in which fits the key 53 so that the carriage 52, while slidable longitudinally of the shaft 50 cannot rotate relatively to the shaft 50, the key 53 being carried by the carriage 52. Projecting outwardly from the carriage 52 is a flange 54 through which the lug 55, which extends downwardly from the housing 57, is secure by means of the bolt 56. As shown in Fig. 3, the studs 58 and 59 which are threaded through the lugs 61 and 60 respectively projecting outwardly from the flange 54, engage opposite sides of the member 55 so as to prevent pivoting of the housing on the bolt 56 as a pivot. A front cover 62 is mounted on the wall 63 of the housing and projecting upwardly from this housing is a handle 65 having a gripping member 64 extending outwardly therefrom. Projecting centrally through the rear wall of the housing 57 is a bolt the numeral 66 which extends through the bushing 67. This bushing 67 is provided with the outwardly projecting flange 68 at the one end. Mounted on this bushing 67 is a cutting blade 69 which is circular in formation and which is positioned between the presser plates 71 and 72 which are clamped against the blade 69 by the means of the nut 72A so that when the blade 69 rotates the bushing 67 will also rotate. The guard member is provided for the cutting blade or disc 69 and comprises the back plate 73 having the radially directed flange 74 projecting therefrom. The wall 63 of the housing is cut away as at 164 as clearly shown in Fig. 3. Formed on the side wall 63 of the housing is a shoulder 75 against which bears one end of a coil spring 76, the other end bearing against a shoulder 78 formed on the radially directed portion 74 of the shield or guard. The construction is such that when the operator pulls forwardly on the handle 65 the housing will rock into the dotted line position shown in Fig. 3, and in this movement the shaft 50 will also be rocked. The mandrel will be rotating in the direction of the arrow shown in Fig. 3, and when this mandrel is brought into contact with the outer surface of the guard 74 the guard 74 will slide against the compression of the spring 76 so as to clear the opening 164 and permit a tube on the mandrel to contact the periphery of the cutting disc or blade 69.

Projecting upwardly from the rear side of the bed 29 is a wall 79 on which are slidably mounted the stops 80 which may be secured in various positions of longitudinal movement on the wall 79 by means of the set screws.

As shown in Fig. 4, a sleeve 81 is rockably mounted on the reduced extension 84 of the carriage 52. The sleeve 81 is retained in position by the nut 83 pressing against the washer 82. The sleeve 81 is provided with the extension 86. In this extension 86 is formed a recess 89 in which is slidably mounted a plunger 87 normally pressed outwardly by the spring 88 to engage the upper face of the bed 29. Formed in this extension 86 is a passage 90 in which is slidably mounted a latch member 91 pressed upwardly by the spring 91a, as shown in Fig. 9. Formed in the extension 86 is a slot 92 communicating with a recess 90 and projecting outwardly from the latch member or plunger 91 is a pin 93 which engages in the slot 92. A releasing lever or handle 94 is pivotally mounted on the extension 86 and provided with a nose 95 adapted to engage the pivotally mounted latch plate 96 as shown in Fig. 3 and Fig. 8. The latch plate 96 is provided with a tongue 97 which is adapted to engage the projecting portion of the pin 93. The construction is such that when the stop members 80 are mounted in the desired position on the wall 79 the carriage 52 may be freely slid in one direction and as the beveled end of the plunger 91 engages the stop 92 the plunger 91 will be pressed inwardly against the compression of the spring 91a. The plunger 91 will resist an attempted sliding movement of the carriage in the opposite direction. After the tube has been placed on the mandrel and the stops 80 have been properly located, the operator may slide the carriage 52 until the plunger 91 clicks under one of the stops 80 whereupon the carriage is slid in the opposite direction to bring the flat face of the plunger 91 into engagement with the stops, thus definitely fixing the position of the carriage relatively to the mandrel. Projecting outwardly from one end of the carriage 52 is a pointer 85 which cooperates with the graduation 181 formed on the upper face of the wall 99 which projects upwardly from the bed 29. This pointer and these graduations may be used for determining the location of the carriage before the cutting operation is performed or may be used in order to determine the location of the stop 80. When the operator desires to move the carriage in the opposite direction the plunger 91 may be moved downwardly by pressing downwardly on the lever 94 which will cause the nose 95 to ride over the inclined surface and force the tongue 97 downwardly carrying the pin 93 with it.

A shaft 50 is journaled in the bearings 103 and 104 and extends beyond the bearing 104. At the opposite side of the bed the shaft is journaled in the bearing 105 as shown in Fig. 13. Fixedly mounted on the shaft 50 is the pulley 106 connected by the endless belt 107 with the pulley 108 which is fixedly mounted on the shaft 109 journaled in the bearing 110. Fixedly mounted on this shaft 109 is a bevel gear 111 meshing with a bevel gear 112 fixedly mounted on the shaft 113. As shown in Fig. 12, shaft 113 is journaled in the bearing 114 and fixedly mounted on the shaft 113 is a disc 115. The shaft 113 also projects through the head 116 projecting outwardly from which is an arm 117, the head 116 being rotatably mounted on the shaft 113. As shown in Fig. 11 the arm 117 carries a supporting boss 118 adapted to engage in the bearing 119 mounted in the end of the shaft or mandrel 36. Formed in the disc 116 is an arcuate slot 120 into which projects a pin 121 carried by the disc 115. The coil spring 122 which embraces the shaft 113 is fastened at one end to the disc 115 and at the opposite end to the head 116. The construction is such that the spring 122 tends to normally swing the arm 117 from the dotted line position shown in Fig. 11, toward the full line position shown in Fig. 11. When the operator moves the cutting disc shown in Fig. 3 from the full line position toward the dotted line position, the shaft 50 will, of course, be rocked. This will effect a rocking of the shaft 113. The spring 122 will normally retain the arm 117 rocked upwardly until the pin 121 engages the lower end of the arcuate slot 120 shown in Fig. 11. When the shaft 50 is rocked to effect a rocking of the shaft 113 the pin will travel upwardly thus permitting the spring 122 to further function to move the arm 117 toward the bearing 119 and as the rocking of the shaft 113 is ended, the pin 121 will engage the other end of the slot 120 as shown in Fig. 11, to securely hold the arm 117 in position. Consequently, as the cutting disc is moved downwardly from the full line position shown in Fig. 3, toward the dotted line position, the mandrel centering mechanism will have moved into the full line position shown in Fig. 11. It remains in this position during the cutting operation. When the cutting disc is cut through the tube which has been placed upon the mandrel and the operator raises the cutting disc preparatory to sliding it along the shaft 50 to effect another cutting operation, the arm 117 will not be disturbed as the pin 121 will not have reached the lower end of the slot 120. Consequently, the slot 120 is made of sufficient length to permit this movement without effecting a movement of the head 116. When the operator has finished the cutting operations he will move the cutting disc from the dotted line position shown in Fig. 3, to the full line position and this will effect a reverse rotation of the shaft 113 sufficiently to move the arm 117 into the dotted line position so that the arm 117 is moved to clear the mandrel and permit the tube placed thereon to be removed.

As shown in Fig. 1, a pulley 123 is fixedly mounted on the shaft 50 and connected by the endless belt 124 to drive the pulley 125 which is fixedly mounted on the switch operating shaft 126 which is intended to operate the switch in the housing 127. The shaft 126 carries the contact member 128 which, when rocked in one direction, is brought into engagement with a contact member 129 to close the circuit to the motor 31. The construction is such that the shaft 126 will not have rocked to a position sufficient to close the circuit until the centering and supporting boss 118 carried by the arm 117 has moved to the position shown in full lines in Fig. 11.

The construction is such therefore, that when the cutting element has been moved to the full line position shown in Fig. 3, and the tube previously placed on the mandrel removed from the gripping members 40, the cut portion of the tube may be moved from the mandrel as the mandrel will be stationary. A new tube may then be placed upon the mandrel and shoved into position to overlie and be engaged by the gripping members 40. The machine is then ready for operation and as the cutting element moves downwardly from the full line position shown in Fig. 3, to effect the cutting operation, a mandrel supporting or centering mechanism moves into position and then the circuit to the motor 31 is closed to rotate the shaft 36 for effecting a rotation of the tube to be cut. As the guard plate 74 comes into contact with the tube it is rotated clockwise from the position shown in Fig. 6 against the compression of the spring 76 to expose the cutting element at the opening 164. The cutting element must, of course, be maintained sharp and it is desired that this blade or disc be used from as thin stock as possible. When the cutting element or blade 69 is brought into engagement with the rotating tube which has been placed upon the mandrel it will, of course, rotate and travel through the tube. Experience has shown that by using the covering 39 of rubber on the mandrel injury to the tube 36 is avoided and scoring of the periphery of this tube is prevented while, at the same time, injury to the cutting edge of the cutting disc or knife 69 is avoided. Experience has also shown that by forming this covering of rubber no slits or cuts will be formed in it as the yieldable material will yield under the cutting element or disc 69 sufficient to provide the necessary clearance for the edge. The operator will know from experience when the cutting element or blade 69 has severed the tube being cut so that further movement into the covering, which might cause a severing of the covering, would not be effected. Experience has also shown that the machine is highly efficient in use as it affords a clean cut on a cardboard or paper tube without any ragged edges and because of its construction makes it possible for a single operator to considerably increase the number of cuts made over that which is used on conventional machines today.

What I claim as new is:

1. In a tube cutting machine of the class described: a rotatable mandrel for supporting a tube to be cut which may be placed thereon; a rotatable cutting member movable into and out of engagement with said tube; a guard plate or covering on the cutting edge of said cutting element and movable into engagement with the tube to be cut, said guard plate being movable into non-guarding position upon engagement with a rotating tube.

2. In a tube cutting machine of the class described: a mandrel for supporting a tube placed thereon to be cut into sections; a rotatable cutting member movable into cutting and non-cutting position; means for rotating said mandrel and effecting a rotation of said tube; a guard plate for covering said cutting element and movable into non-guarding position upon engagement with a rotating tube, said guard plate being positioned relatively to said cutting element for engagement with said tube prior to the movement of said cutting element into cutting position.

3. In a tube cutting machine of the class described: a rotatable mandrel adapted for reception of a tube to be cut into sections and placed thereon; means for rotating said mandrel; an electric motor for operating said rotating means; a cutting element movable into cutting and non-cutting positions and the means operable, upon movement of said cutting element a predetermined distance, from non-cutting position to cutting position, for closing the circuit to said motor.

4. In a tube cutting machine of the class described: a rotatable mandrel adapted for reception of a tube to be cut into sections and placed thereon; means for rotating said mandrel; an electric motor for operating said rotating means; a cutting element movable into cutting and non-cutting positions and the means operable, upon movement of said cutting element a predetermined distance, from non-cutting position to cutting position, for closing the circuit to said motor, and operable upon movement of said cutting element a pre-determined distance from cutting position toward non-cutting position for breaking the circuit to said motor.

5. In a tube cutting machine of the class described: a tube receiving mandrel for reception of a tube which may be placed thereon for cutting operation; means for supporting said mandrel at one end; means for rotating said mandrel; an electric motor for operating said rotating means; a movable member for engaging the free end of said mandrel and supporting and centering the same; a cutting element movable into operative and inoperative position; means operable upon movement of said cutting element a predetermined distance from inoperative toward operative position for moving said supporting means into engagement with said mandrel; and means for closing the circuit to said motor upon movement of said cutting element toward operative position subsequent to the movement of said supporting and centering means into engagement with said mandrel.

6. In a tube cutting machine of the class described: a tube receiving mandrel for reception of a tube which may be placed thereon for cutting operation; means for supporting said mandrel at one end; means for rotating said mandrel; an electric motor for operating said rotating means; a movable member for engaging the free end of said mandrel and supporting and centering the same; a cutting element movable into operative and inoperative position; means operable upon movement of said cutting element a predetermined distance from inoperative toward operative position for moving said supporting means into engagement with said mandrel; means for closing the circuit to said motor upon movement of said cutting element toward operative position subsequent to the movement of said supporting and centering means into engagement with said mandrel, and operative for breaking the circuit to the motor upon movement of said cutting element a predetermined distance from operative toward inoperative position; and means operative subsequent to the breaking of said circuit for moving said supporting member out of engagement with said mandrel.

7. In a tube cutting machine of the class described: a rotatable mandrel for reception of a tube placed thereon to be cut into sections; means for supporting said mandrel adjacent one end; a movable supporting member for engaging and supporting the opposite end of said mandrel and movable into supporting and non-supporting positions; a carriage slidable of said mandrel longitudinally thereof; means for supporting said carriage; a cutting element carried by said carriage and movable into operative and inoperative positions, said supporting member being rockable upon movement of said cutting element from one position to the other; means for effecting a movement of said supporting means to supporting position upon rocking of said supporting means on which said slide is mounted in one direction.

8. In a tube cutting machine of the class described: a rockably mounted elongated supporting member; a carriage slidably mounted on said supporting member and rockable in unison therewith; a rotatable mandrel for reception of a tube placed thereon to be cut into sections; an electric motor for rotating said mandrel; and means operable for, upon rocking of said carriage in either direction for making or breaking the circuit to said motor.

9. In a tube cutting machine of the class described: an elongated rockable supporting rod; a carriage slidably mounted on and rockable in unison with said rod; a rotatable mandrel extending parallel and in spaced relation to said rod for reception of a tube to be placed thereon for cutting into sections; means for supporting said mandrel adjacent one end; a movable engaging member for engaging the free end of said mandrel and supporting the same and movable into engaging and non-engaging positions; and the means operable upon the rocking of said rod in one direction for moving said engaging means toward engaging position.

10. In a tube cutting machine of the class described: an elongated rockable supporting rod; a carriage slidably mounted on and rockable in unison with said rod; a rotatable mandrel extending parallel and in spaced relation to said rod for reception of a tube to be placed thereon for cutting into sections; means for supporting said mandrel adjacent one end; a movable engaging member for engaging the free end of said mandrel and supporting the same and movable into engaging and non-engaging positions; and the means operable upon the rocking of said rod in one direction for moving said engaging means toward engaging position; and means for retaining said engaging means in engaged position.

11. In a tube cutting machine of the class described: an elongated rockable supporting rod; a carriage slidably mounted on and rockable in unison with said rod; a rotatable mandrel extending parallel and in spaced relation to said rod for reception of a tube to be placed thereon for cutting into sections; means for supporting said mandrel adjacent one end; a movable engaging member for engaging the free end of said mandrel and supporting the same and movable into engaging and non-engaging positions; and the means operable upon the rocking of said rod in one direction for moving said engaging means toward engaging position; and means for retaining said engaging means in engaged position; and means for moving said engaging means to non-engaging position upon rocking of said rod a predetermined distance in the opposite direction.

12. In a tube cutting machine of the class described: a rotatable mandrel adapted for reception of a tube placed thereon to be cut into sections; a supporting rod extending parallel and in spaced relation to said mandrel; a stop supporting member extending parallel and in spaced relation to said rod; a plurality of stops adjustably mounted on said stop supporting member; a carriage slidably mounted on said rod; a cutting element carried by said carriage and movable into position for cutting a tube on said mandrel; and means on said carriage for engaging said stops and determining the position of cut of said tube on said mandrel.

13. In a tube cutting machine of the class described: a rotatable mandrel adapted for reception of a tube placed thereon to be cut into sections; a supporting rod extending parallel and in spaced relation to said mandrel; a stop supporting member extending parallel and in spaced relation to said rod; a plurality of stops adjustably mounted on said stop supporting member; carriage slidably mounted on said rod; a cutting element carried by said carriage and movable into position for cutting a tube on said mandrel; means on said carriage for engaging said stops and determining the position of cut of said tube on said mandrel; and means for moving said stop engaging means to inoperative position for permitting free slidable movement of said carriage on said rod.

14. In a tube cutting machine of the class described: a rotatable mandrel adapted for reception of a tube placed thereon to be cut into sections; a supporting rod extending parallel and in spaced relation to said mandrel; a stop supporting member extending parallel to and in spaced relation to said supporting rod; a plurality of stops adjustably mounted on said stop supporting member and movable to various positions thereon; a carriage slidably mounted on said rod; a cutting element carried by said carriage and movable into position for cutting a tube placed on said mandrel; a latch mechanism engageable with said stops upon sliding of said carriage on said rod in one direction and movable, upon engagement with said stops, into inoperative position and adapted, upon movement of said carriage in the opposite direction, for engaging said stops and preventing sliding movement of said carriage in said direction for determining the location of cuts on a tube on said mandrel.

15. In a tube cutting machine of the class described: a rotatable mandrel adapted for reception of a tube placed thereon to be cut into sections; a supporting rod extending parallel and in spaced relation to said mandrel; a stop supporting member extending parallel to and in spaced relation to said supporting rod; a plurality of stops adjustably mounted on said stop supporting member and movable to various positions thereon; a carriage slidably mounted on said rod; a cutting element carried by said carriage and movable into position for cutting a tube placed on said mandrel; a latch mechanism engageable with said stops upon sliding of said carriage on said rod in one direction and movable, upon engagement with said stops, into inoperative position and adapted, upon movement of said carriage in the opposite direction, for engaging said stops and preventing sliding movement of said carriage in said direction for determining the location of cuts on a tube on said mandrel; and means for releasing said latch mechanism at will for the moving of said carriage in either direction.

ALEXANDER G. MARION.

REFERENCES CITED

The following references are of record in the file of this patent:

UNITED STATES PATENTS

| Number | Name | Date |
|---|---|---|
| 1,546,564 | Cameron | July 21, 1925 |
| 1,573,613 | Johnstone | Feb. 16, 1926 |
| 1,892,058 | Judelshon | Dec. 27, 1932 |
| 2,181,124 | Edwards et al. | Nov. 28, 1939 |
| 2,206,262 | Olt | July 2, 1940 |
| 2,398,929 | Forsberg | Apr. 23, 1946 |